United States Patent [19]

Ingman et al.

[11] Patent Number: 6,069,804
[45] Date of Patent: May 30, 2000

[54] BI-DIRECTIONAL DC-TO-DC POWER CONVERTER

[75] Inventors: Thomas M. Ingman, Somis; John W. Beecroft, Camarillo; Charles E. Mullett, Santa Paula, all of Calif.

[73] Assignee: Condor D.C. Power Supplies, Inc., Oxnard, Calif.

[21] Appl. No.: 09/359,499

[22] Filed: Jul. 23, 1999

Related U.S. Application Data

[60] Provisional application No. 60/094,448, Jul. 28, 1998.

[51] Int. Cl.$^7$ ................................................. H02M 3/335
[52] U.S. Cl. ............................................ 363/21; 363/131
[58] Field of Search ................................. 363/17, 21, 80, 363/97, 131, 16; 323/222, 271, 282

[56] References Cited

U.S. PATENT DOCUMENTS

| | | | |
|---|---|---|---|
| 3,569,818 | 3/1971 | Farnsworth | 321/2 |
| 3,986,097 | 10/1976 | Woods | 321/2 |
| 4,491,835 | 1/1985 | Aron | 340/739 |
| 4,716,514 | 12/1987 | Patel | 363/127 |
| 4,736,151 | 4/1988 | Dishner | 323/224 |
| 4,853,837 | 8/1989 | Patel | 363/127 |
| 5,221,887 | 6/1993 | Gulezynski | 323/285 |
| 5,237,606 | 8/1993 | Ziermann | 379/413 |
| 5,303,138 | 4/1994 | Rozmon | 363/21 |
| 5,402,329 | 3/1995 | Wittenbreder, Jr. | 363/16 |
| 5,528,482 | 6/1996 | Roman | 363/21 |
| 5,552,695 | 9/1996 | Schwartz | 323/271 |
| 5,594,629 | 1/1997 | Steigerwald | 363/21 |
| 5,625,541 | 4/1997 | Rozman | 363/21 |
| 5,636,116 | 6/1997 | Milavec et al. | 363/89 |
| 5,663,874 | 9/1997 | Mader et al. | 363/17 |
| 5,828,558 | 10/1998 | Korcharz et al. | 363/20 |
| 5,959,241 | 9/1999 | LoCascio | 363/21 |

FOREIGN PATENT DOCUMENTS 01174265   10/1989   European Pat. Off. ......... H02M 1/10

OTHER PUBLICATIONS

Article, by C. P. Henze, H. C. Martin and D. W. Parsley Zero–Voltage Switching in High Frequency Power Converters using Pulse Width Modulation APEC Record, Feb. 1–5, 1988, pp. 33–41; Published Sep. 1988, by IEEE as IEEE Publication, CH2504–9/88/0000 $1.00 pp. 33 through 40.

*Primary Examiner*—Jessica Han
*Attorney, Agent, or Firm*—James F. Kirk

[57] ABSTRACT

A multi-output, multi-directional power converter has an input bi-directional switch and at least a first output bi-directional switch, a coupled inductor having an input winding and at least one output winding. The coupled inductor input winding is connected in series with the input voltage source and an input bi-directional switch. Each coupled inductor output winding is connected in series with a corresponding output voltage source such as a capacitor and its respective output bi-directional switch. A clock circuit provides a first and second control signal. Each control signal has a first and second state. The second control signal has a state that is the complement of the first control signal. The first control signal is connected to the input bi-directional switch control terminal and the second control signal is connected to each respective output bi-directional switch control terminal. The input bi-directional switch is driven into a conductive state in response to the first control signal being in a first state and into a non-conductive state in response to the second control signal being in a second state. Each respective output bi-directional switch conduction channel is driven into a conductive state in response to the second control signal being in a first state and into a non-conductive state in response to the second control signal being in a second state. In an alternative embodiment, a resonant transition control means senses the coupled inductor input and output winding currents and the output voltage and adjusts the clock frequency to provide operation in a resonant transition mode.

17 Claims, 11 Drawing Sheets

BI-DIRECTIONAL DC-TO-DC POWER CONVERTER

CROSS REFERENCE TO PRIOR APPLICATION

This application claims the benefit of United States provisional application No. 60/094,448, filed Jul. 28, 1998.

TECHNICAL FIELD

The subject invention relates to the field of pulse-width-modulated dc-to-dc switching converters and more particularly to that class of switching converter referred to as a flyback converter. While operating into a fixed load, and when powered from a substantially fixed input source of voltage, dc-to-dc converters typically operate in one of three modes. The three modes of operation are the discontinuous conduction mode, the critical conduction mode and the continuous conduction mode. The invention bi-directional dc-to-dc power converter is designed to operate in the continuous conduction mode in which the composite sum of the load current plus the magnetizing current is circulating through the input transformer's (coupled inductor's) input winding or output winding exclusively depending on whether the input or output bi-directional switch is on.

BACKGROUND ART

The present invention is directed to an improved flyback converter in which energy is re-circulated through the converter's flyback transformer windings in a controlled manner to eliminate the need for pre-load or bleeder resistors on the output(s) and to provide enhanced cross regulation on lightly loaded multiple output windings.

Conventional dc-to-dc power flyback converters designed for discontinuous mode operation subject the input power bus to a demand for current that ramps up from zero to a controlled peak level into the primary of a coupled inductor and is then interrupted. The input current then remains zero for an interval typically greater than one half of the total power period. At the instant the input current is interrupted, the stored energy in the coupled inductor forces current to immediately start flowing in the secondary or output winding. The wave shapes of the input current to the primary and the output current from the output winding are the same as that of a right triangle in each case. The current wave shapes thus produced are therefore the least desirable from the standpoint of stress management. In addition, during that period that follows the reset of the core as the current in the secondary falls to zero, and before the start of the next power cycle, the coupled inductor is performing no function.

Conventionally designed dc-to-dc power converters are typically provided with bleeder resistors that provide a minimum guaranteed load to prevent the output voltage from increasing at light load and to reduce the likelihood of a temporary spike on the output in the event of normal load interruption. The control loop bandwidth is limited and if a converter were operating at 50–150 kHz, a number of power cycles might be produced after the interruption of the load before the duty cycle on-time could be reduced, resulting in a jump in voltage on an unloaded output. Although necessary, a bleeder contributes to loss of efficiency. Flyback dc-to-dc power converters having multiple output windings typically have bleeder resistors on all outputs for the same reason as above and also because energy stored in the leakage inductance of the primary is coupled to the secondary windings and voltage on an isolated unloaded secondary output will continue to rise with the interruption of a normal load if there is no bleeder. Bleeders are also used on multiple outputs to enhance cross regulation.

SUMMARY OF THE PRESENT INVENTION

Accordingly, it is an objective of the present invention to obviate the above-noted shortcomings and disadvantages of known flyback switching converters by providing a bi-directional dc-to-dc power converter having an input coupled to an input voltage source such as a battery or rectified and filtered ac line source. The bi-directional dc-to-dc power converter has an output coupled to an output voltage source such as a charged filter capacitor or a battery. The converter comprises at least two bi-directional switches, an input bi-directional switch such as a power FET having a conduction channel between its drain and source, and a control terminal such as a gate, and an output bi-directional switch, such as a power FET, having a conduction channel and a control terminal such as a gate.

The bi-directional dc-to-dc power converter has a coupled inductor, such as a flyback transformer, having an input winding and at least one output winding. The coupled inductor input winding is tightly coupled to the output winding. In a first embodiment, the coupled inductor input winding is connected in series with the input voltage source and the input bi-directional switch conduction channel. The coupled inductor output winding is connected in series with the output voltage source and the output bi-directional switch conduction channel. A clock circuit with a substantially fixed clock period provides first and second control signals such as the drive signals that reach the gates of FETs 28 and 34 in FIG. 7. Each control signal has a first and second state. The second control signal has a state that is the complement of the state of the first control signal. When the first control signal is high, the second is low and vice versa. The first control signal first state duration is followed by the second control signal first state duration substantially forming the clock period. The first control signal's first state portion of the total period is referred to as its duty ratio, D, and the remaining portion is referred to as D'. The first control signal is coupled to the input bi-directional switch control terminal, such as the gate of FET 28, and the second control signal is coupled to the output bi-directional switch control terminal, such as the gate of FET 34. The input bi-directional switch conduction channel, such as the channel of FET 28, is driven into a conductive state in response to the first control signal being in a first state, such as a high state, and into a non-conductive state in response to the first control signal being in a second state, such as a low state or ground state. The output bi-directional switch conduction channel, such as the channel of FET 34, is driven into a conductive state in response to the second control signal being in a first state, such as a high or positive state and into a non-conductive state in response to the second control signal being in a second state, or low state. The first and second control signals drive the respective switches so that one switch or the other is on at all times and in such a way that the switches can conduct current in either direction.

In a second alternative embodiment, the coupled inductor has at least two output windings. The coupled inductor input winding is tightly coupled to each output winding. Each output winding is coupled to an output voltage source, such as a capacitor and load as described for the first embodiment. Each voltage source conducts through its respective output bi-directional switch during the D' control signal interval, as necessary, to enhance cross regulation or to support continuous operation during a temporary interruption of power from the input voltage source.

In a third alternative embodiment, having at least two output windings, at least one output winding is coupled to a battery and at least a second output winding is coupled to an output voltage source, such as a capacitor and load as described for the first embodiment. An input bi-directional switch has a conduction channel and a control terminal, such as a gate. At least a first and second output bi-directional switch each have a conduction channel and a control terminal, such as a gate. A clock circuit provides a first and second control signal as in the first embodiment. The second control signal is connected to the first and second output bi-directional switch control terminals. The first and second output bi-directional switch conduction channels are driven into a conductive state in response to the second control signal being in a first state and into a non-conductive state in response to the second control signal being in a second state such as ground. The first output winding is coupled in series with the battery and the first output bi-directional switch conduction channel. The second output winding is coupled in series with the output voltage source and the second output bi-directional switch conduction channel.

In a fourth embodiment, a control circuit means for providing a clock signal with a fixed period to set the output of a latch to a first state, the output of the latch driving the first control signal high, sensing the output voltage of the converter, comparing a portion of the output voltage with a precision internal reference voltage to provide an error voltage, sensing the input winding current rise in the input winding as a ramp current voltage, comparing the ramp current voltage with the error voltage, providing a reset signal to the latch to zero set the latch to a second state in response to the ramp current voltage exceeding the error voltage, the zero set output of the latch driving the first control signal low, the latch being set to the first state on receiving the next clock signal.

A fifth alternative embodiment uses a resonant transition control means for sensing the coupled inductor input and output winding currents and the output voltage and for adjusting the clock frequency to provide operation in a resonant transition mode and to adjust the output voltage to a predetermined level.

In a sixth alternative embodiment based on the third alternative embodiments, a controlled bi-directional current regulator, such as a resistor connected in parallel with a blocking diode is added in series with the battery to enable the battery to be continually charged. The battery conducts through a second blocking diode or alternatively, a boost converter, to provide power to its respective output as necessary to enhance cross regulation or to support continuous operation during a temporary interruption of power from the input voltage source.

DISCLOSURE OF THE INVENTION

Conventional flyback converter designs, including those using synchronous rectifiers, attempt to prevent any reverse current flow through the MOSFET transistor switches used as rectifiers. Such reverse current flow in the switches is believed to reduce the efficiency of the converter.

Applicants have discovered, however, that if the reverse flow of current is properly controlled and recirculated it can improve the operation of single and multiple-output flyback converters. Improvements are made possible in operating efficiency, cross regulation, high line no load stability, and in load transient response. Battery backup operation is more easily accomplished.

In addition, a further increase in efficiency is made possible by the use of a resonant transition control means for sensing the coupled inductor input and output winding currents and the output voltage and for adjusting the clock frequency to provide switching operation in a resonant transition mode and to adjust the output voltage to a predetermined level. In the resonant transition mode of operation, to be discussed in connection with FIGS. 6, 10 and 11, the period of the clock circuit is adjusted to provide substantially resonant transitions on both the input and output bi-directional switches.

FIGS. 1 and 7–10 illustrate embodiments of the invention bi-directional dc-to-dc power converter employing recirculated energy in accordance with the present claimed invention. The invention bi-directional dc-to-dc power converter is designed to operate in the continuous mode at all times. At no time during a power cycle, except for extremely short transient durations during the transition from one state to another, are the input and output switches both on or both off. Both input and output switches retain the ability to conduct current in both directions at all times when on.

Figure 1:
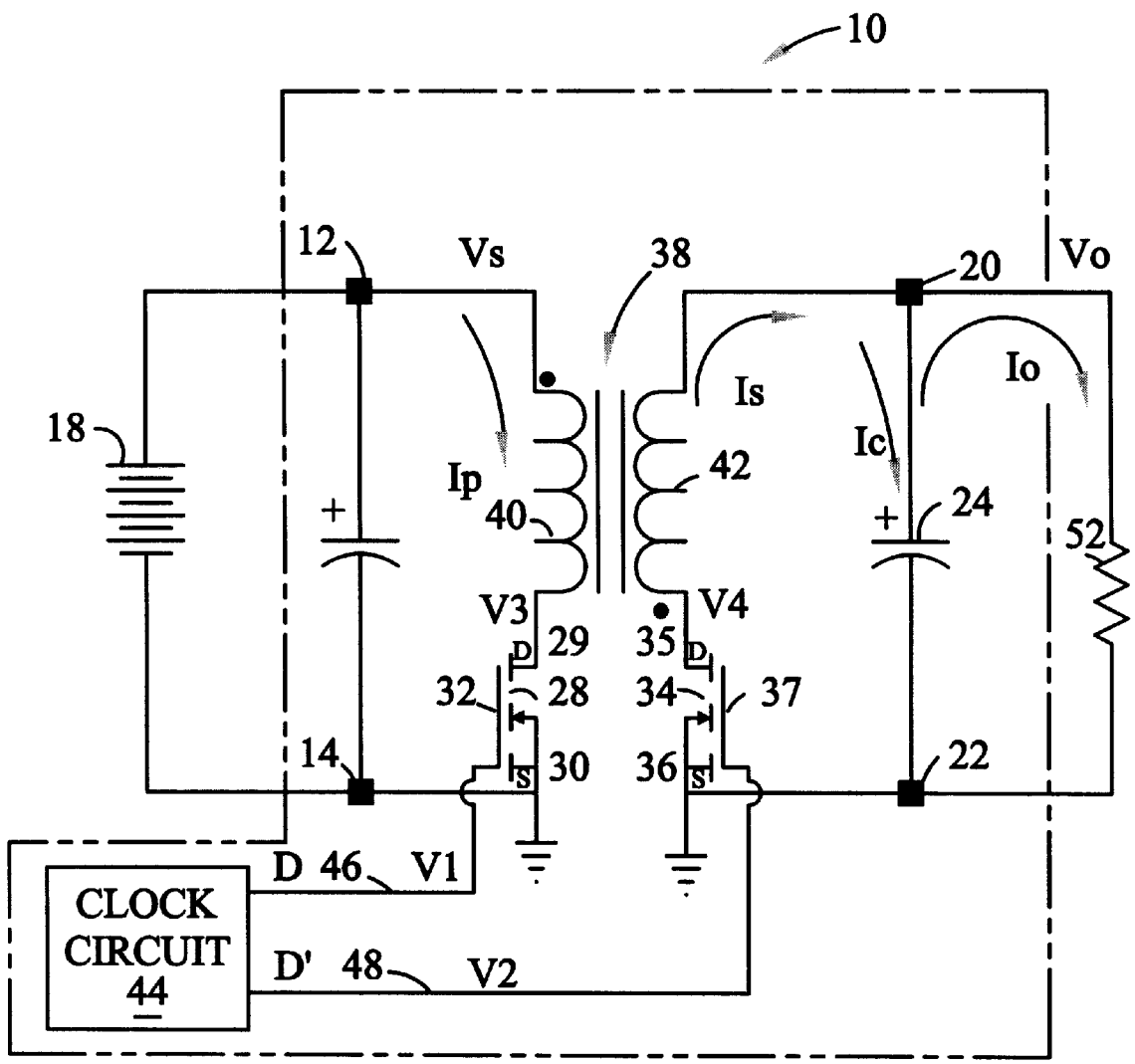
FIG. 1 is a schematic diagram of the major elements in a bi-directional dc-to-dc power converter having an input coupled to an input voltage source and an output connected to a first output voltage source.

FIG. 1 shows the elements of the invention bi-directional dc-to-dc power converter 10 having first and second input terminals 12, 14 coupled to an input voltage source shown as a battery 18, and first and second output at terminals 20, 22 coupled to a first output voltage source shown as a capacitor 24. Output filter capacitors such as capacitor 24 typically have a high value of capacitance, a correspondingly high energy storage capability and a low series resistance. An output filter capacitor may therefore be regarded as being capable of providing the function of a voltage source for a given design for a predetermined time interval, for a predetermined maximum demand and for a given predetermined voltage drop.

The invention bi-directional dc-to-dc power converter has an input bi-directional switch represented by N-channel power FET 28 having a conduction channel between its drain 29 and source 30 and a control terminal represented by gate 32. A first output bi-directional switch represented by N-channel power FET 34 has a conduction channel between its drain 35 and source 36 and a control terminal represented by gate 37.

Transformer 38 is a coupled inductor having an input winding 40 and a first output winding 42. The coupled inductor input winding 40 is tightly coupled to the first output winding 42. The core is typically a gapped ferrite E-core with a cylindrical center leg or a powdered iron or ferrite toroid with ferrites being favored for use in higher frequency applications.

The coupled inductor input winding 40 is connected in series with the input voltage source 18 and the input bi-directional switch 28 conduction channel. The coupled inductor first output winding 42 is connected in series with the first output voltage source, capacitor 24 and the first output bi-directional switch 34 conduction channel. The clock circuit 44 provides a first control signal V1 shown in FIG. 1 on a first signal line 46 and second control signal V2 shown on a second signal line 48. The control signals have only two possible states. Each control signal has a first state such as plus ten volts and a second state, such as zero volts. The second control signal, V2, on signal line 48 has a state that is the complement of the state of the first control signal, V1, on signal line 46. The word "complement" is meant to convey the meaning that when the first control signal V1 is at plus ten volts, the second control signal is at zero volts and vice versa.

Figure 2:
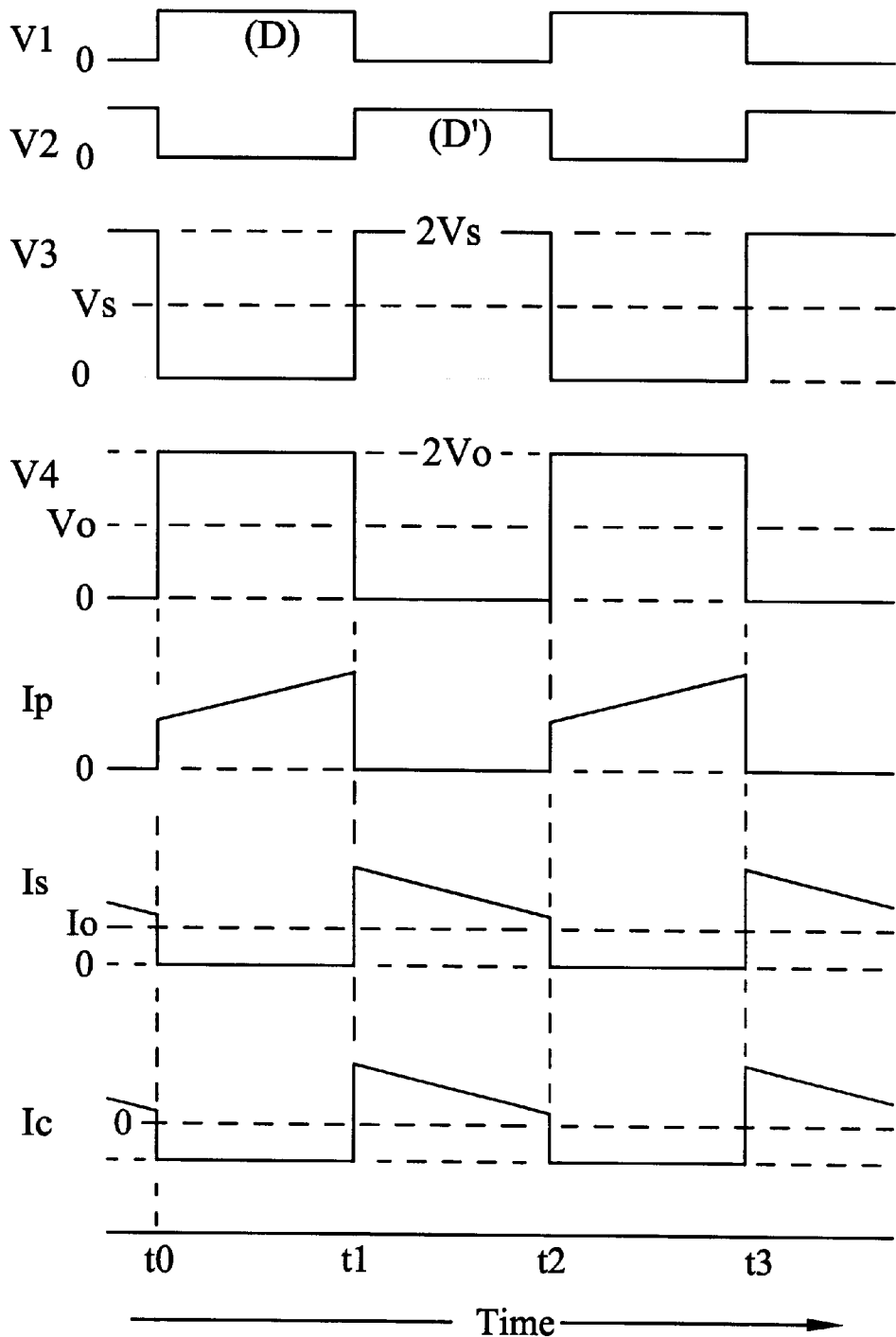
FIG. 2 is a timing diagram for the bi-directional dc-to-dc power converter operating with a normal load and with a 50% duty cycle.

The clock circuit 44 has a clock period represented in FIG. 2 as the interval between t0 and t2. The first control signal V1 first state duration followed by the first control signal second state duration substantially determines the clock period. The first control signal V1 is connected to the input bi-directional switch control terminal, gate 32, and the second control signal V2 is connected to the first output bi-directional switch control terminal, gate 37.

The input bi-directional switch conduction channel between drain 29 and source 30 is driven into a conductive state in response to the first control signal, V1, assuming a first state, such as +10V, and into a non-conductive state in response to the first control signal assuming a second state, such as 0.0 V.

The first output bi-directional switch conduction channel between its drain 35 and source 36, is driven into a conductive state in response to the second control signal, V2, being in a first state, and into a non-conductive state in response to the second control signal being in a second state.

Figure 7:
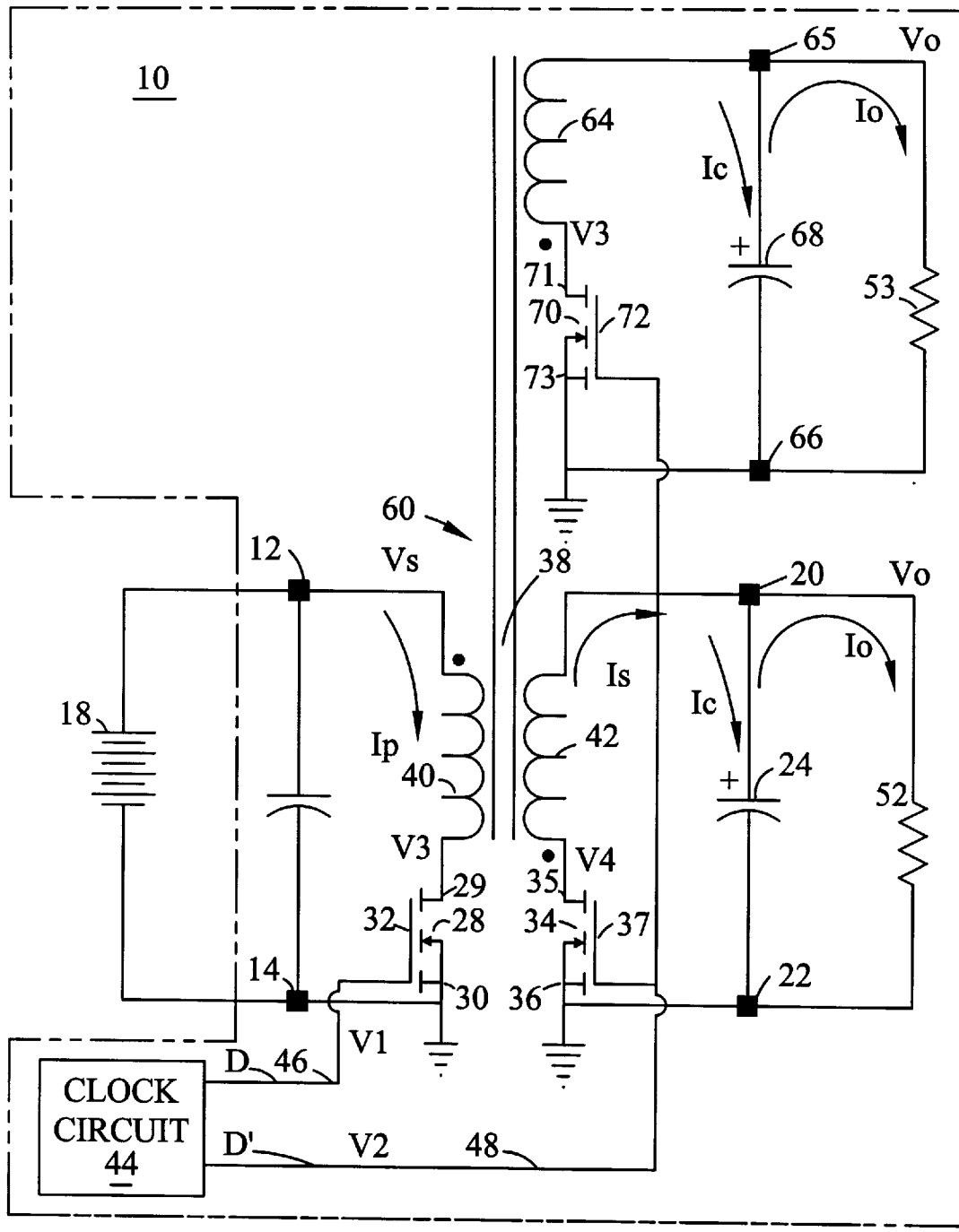
FIG. 7 is a schematic diagram of the bi-directional dc-to-dc power converter showing a first and second output winding each respective output winding being connected in series with a respective bi-directional switch and a respective voltage source.
Figure 8:
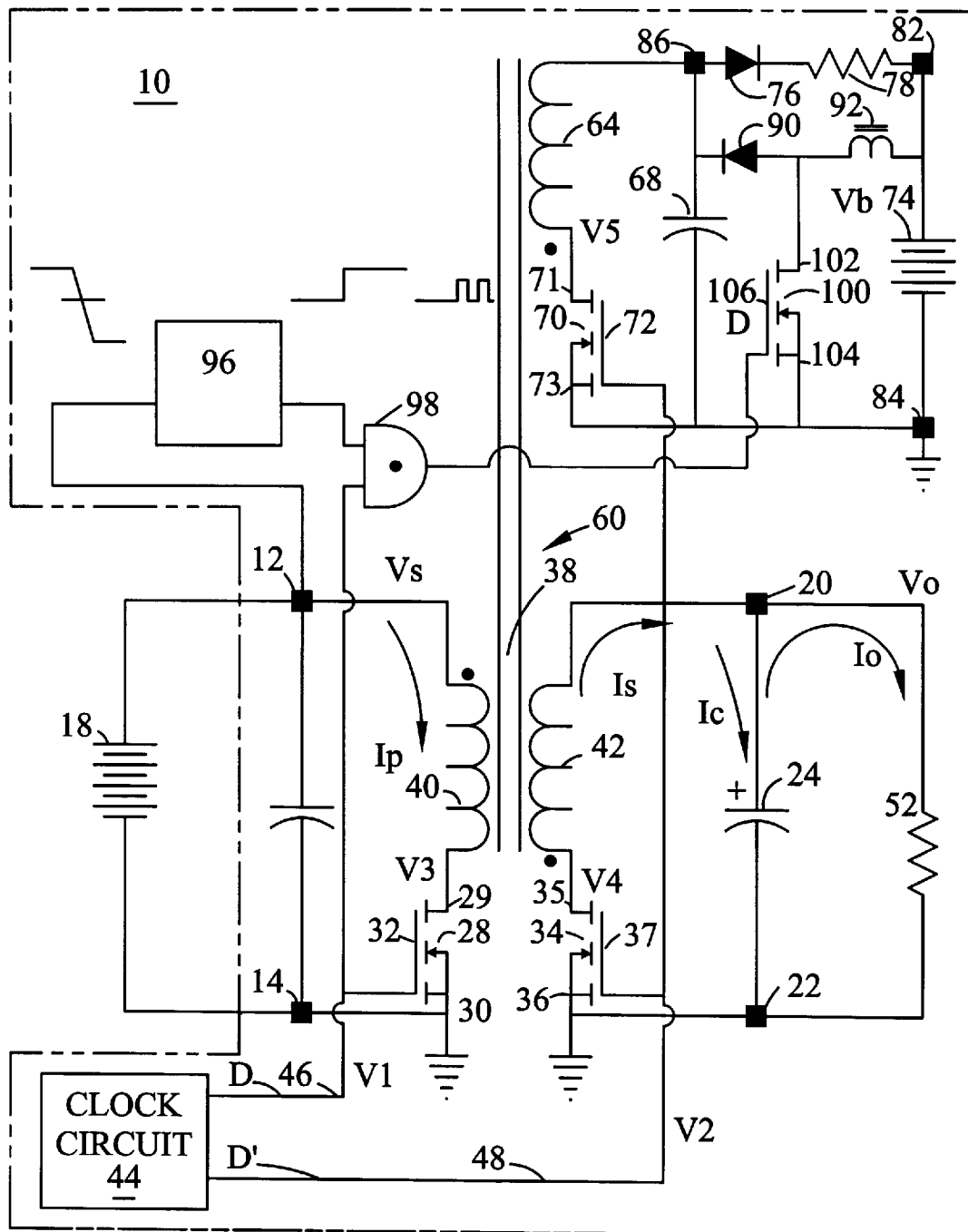
FIG. 8 is a schematic diagram of the bi-directional dc-to-dc power converter of FIG. 7 with the addition of components necessary for a controlled directional current regulator in series with the battery and the second output winding 64.
Figure 9:
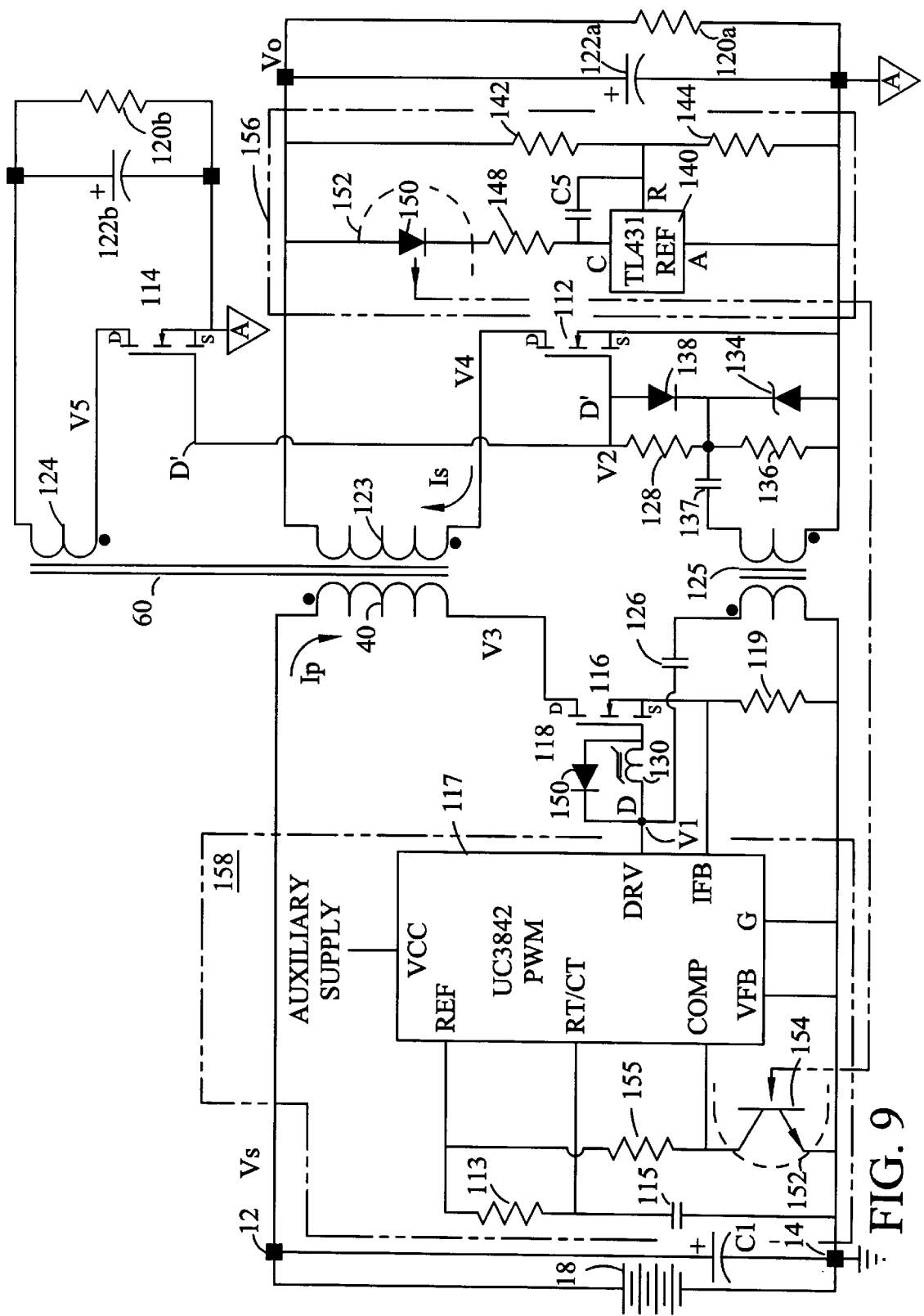
FIG. 9 is a schematic diagram of the bi-directional dc-to-dc power converter showing the use of a UC3842 integrated circuit to provide a first and second control signal with a substantially fixed total period.

In the circuit embodiments such as those of FIGS. 7, 8 and 9, the clock circuit 44 operates with a fixed period. Embodiments that use a first control signal with a first state having a fixed interval followed by second state having a variable interval provide a variable period, are also contemplated as being within the scope of this invention.

Figures 6A, 6B, 6C:
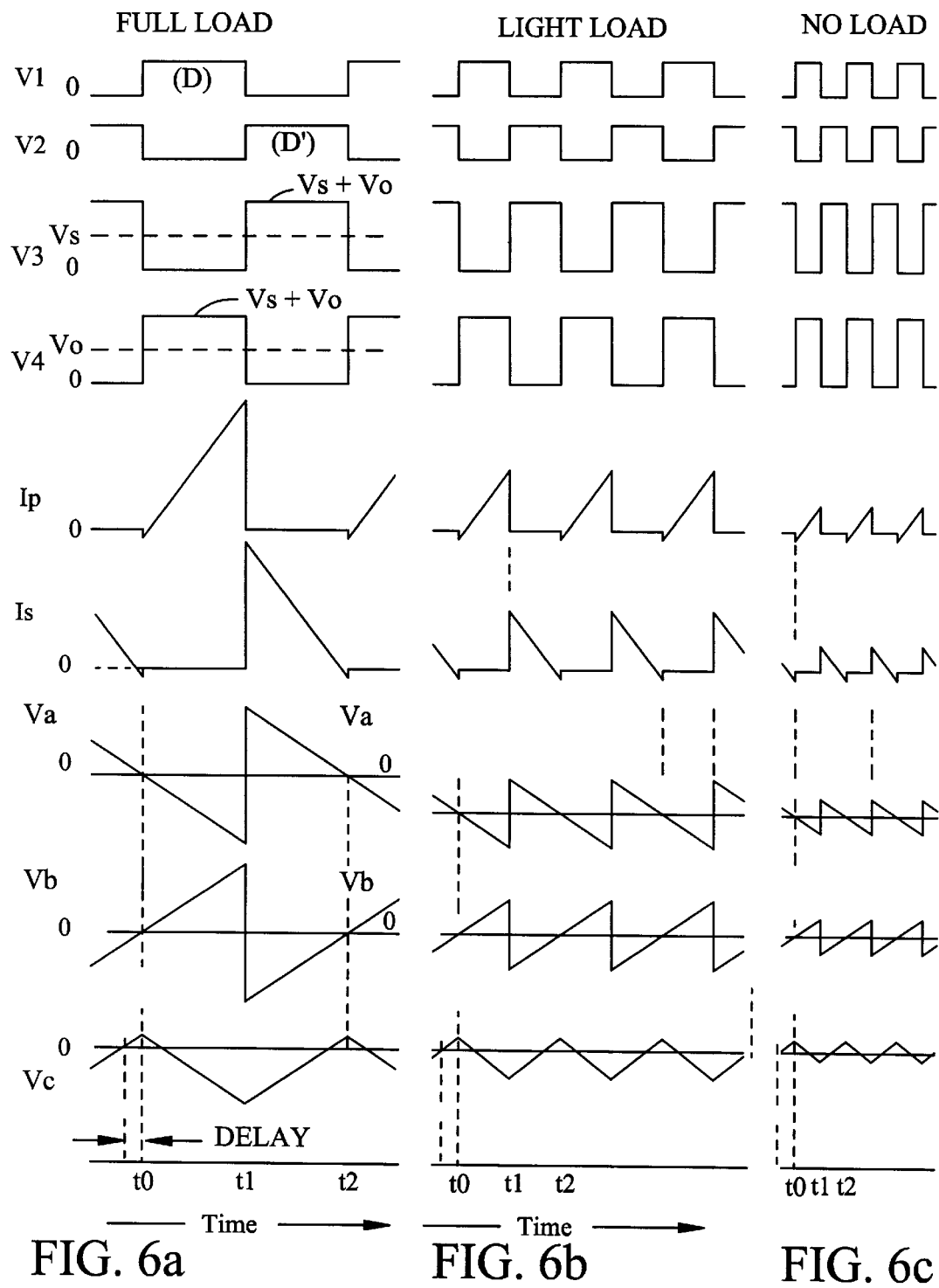
FIGS. 6a–6c show three timing diagram charts for each of three load conditions for a bi-directional dc-to-dc power converter adjusted to provide resonant transitions on both the input and output bi-directional switches.
Figure 10:
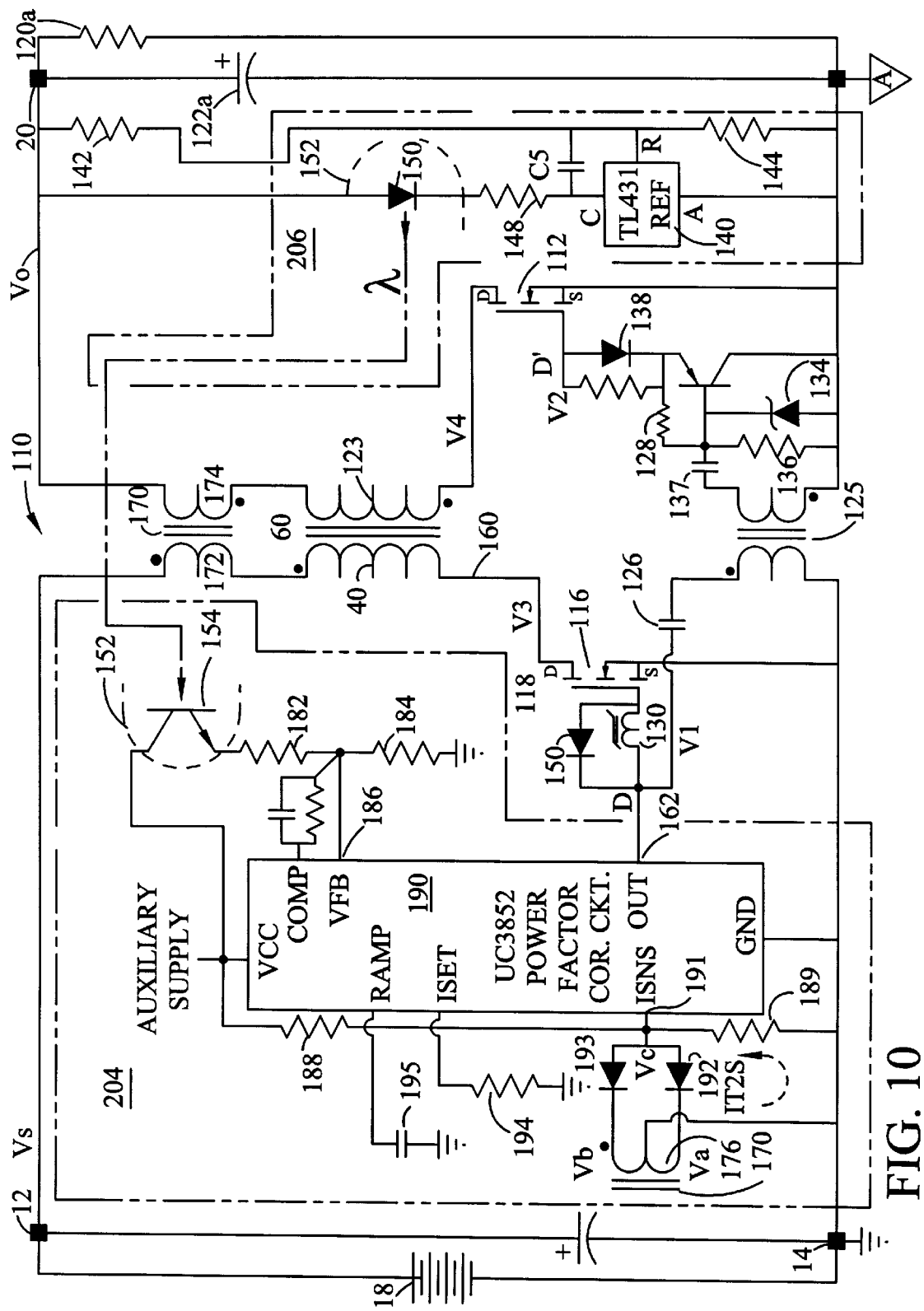
FIG. 10 is a schematic diagram of the bi-directional dc-to-dc power converter showing the use of a UC3852 as a controller to provide a first and second control signal with a variable total period.

In addition, clock and control circuits, such as shown in FIG. 10, have first and second control signals with first and second states of substantially equal durations but have total periods that are variable as shown in FIGS. 6a–6c. In the embodiment of FIG. 10, the total period is adjusted to provide substantially resonant transitions on both the input and output bi-directional switches 116, 112 respectively.

Figure 3:
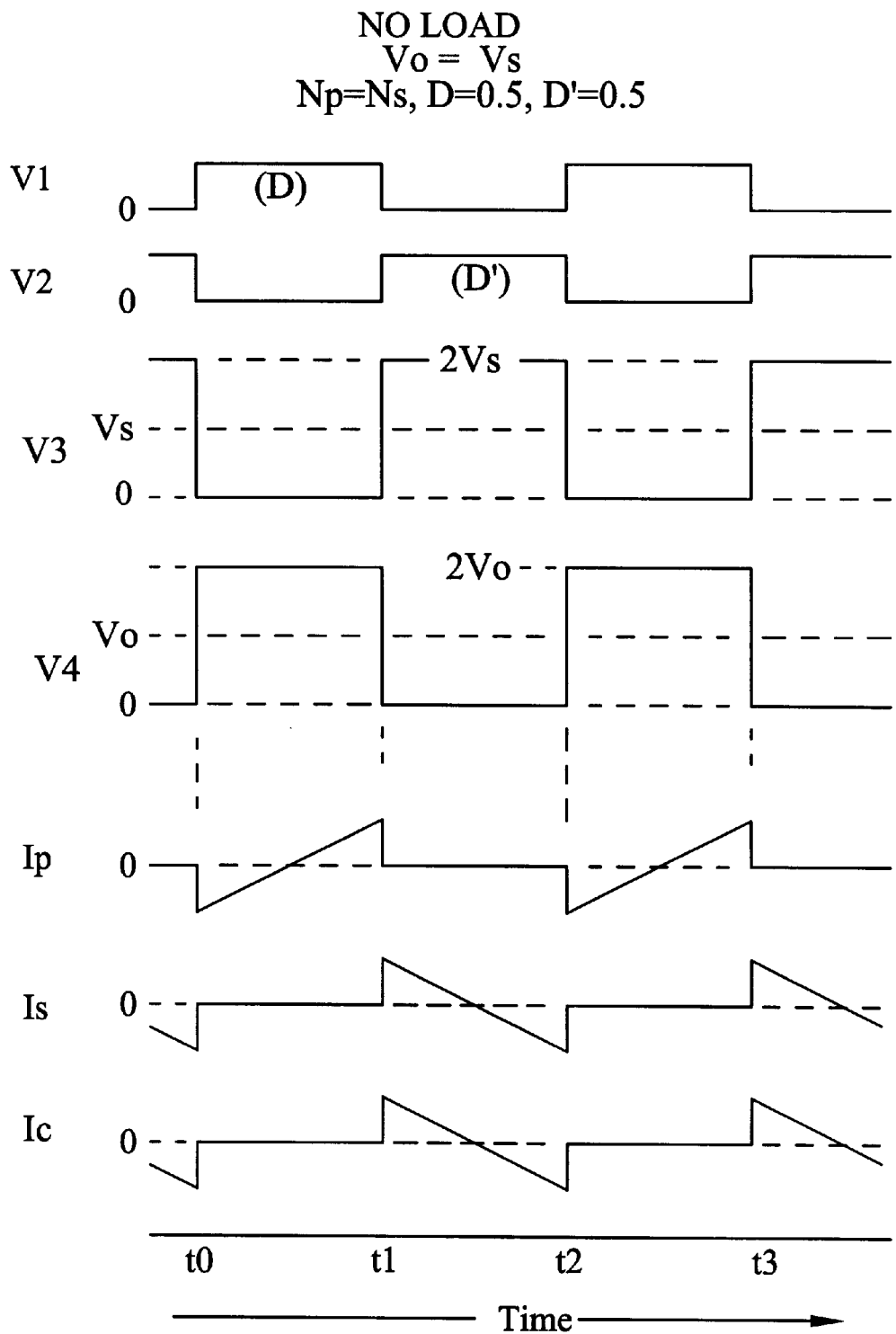
FIG. 3 is a timing diagram for the bi-directional dc-to-dc power converter operating with a no load and with a 50% duty cycle.

FIG. 2 and FIG. 3 show the voltage and current waveforms at two nodes in the invention circuit for two operating conditions. FIG. 2 shows the waveforms with a normal output load. FIG. 3 shows the waveforms at the same node and currents through the same branch with an output load of zero and with no bleed resistors.

The first output voltage source of FIG. 1 is depicted as capacitor 24. First and second output voltage sources are shown as capacitors 24, 68 in FIG. 7. In the alternative embodiment of FIG. 8, to be discussed later, a battery 74 or another filter capacitor 68 will be connected to serve as a second output voltage source on a second output winding. The output voltage source will normally be connected in parallel with a load such as load resistor 52. The capacitors 24, 68 are sized to have sufficient energy storage to function as a first output voltage source for short intervals such as between one or more power cycles or clock periods at maximum load.

FIG. 7 shows the dc-to-dc power converter of FIG. 1 wherein the coupled inductor, transformer 60, has at least a first and second output winding 42, 64, each respective output winding being coupled through a respective bi-directional switch 34, 70 to a respective output voltage source such as capacitors 24, 68. Capacitor 24 is depicted as operating in parallel with its respective load resistor 52. Capacitor 68 is shown as operating in parallel with its respective load resistor 53. An interruption of the input voltage source or of the load on a different output winding permits an output voltage source (be it a capacitor or a battery) to provide energy to its respective winding thereby supporting the reflected load or absence of load as demanded by other output windings.

The voltage source provided by capacitor 68 acts as a clamp on the voltage across the second output winding 64 during the high state of the V2 clock control signal, and in the event of a loss of input voltage from the input voltage source or in the event of an unanticipated transient demand for current from the first output voltage source, the secondary output voltage source is capable of supplying current to the second output winding 64 in a reverse direction from that of a charging direction so as to provide support for the loss of input power or the reflected transient demand on the first output voltage source.

It may be seen that the duty cycle of the converter remains essentially fixed for all load conditions and the current waveforms of both input and output shift vertically depending on load. As the load is decreased below what would be critical conduction in a standard flyback, the excess energy is recirculated back to the input. The duty cycle of the multiple output multi-directional power converter is now a function of the volt-second requirements of the primary and secondary windings only and proper operation is maintained down to no load. If the input and outputs ports are considered, energy can flow from any port to any other port.

FIG. 7 shows each respective secondary or output winding 42, 64 as isolated from the primary and the input winding 40 with each respective output winding 42, 64 connected in series with the conduction channel of a respective output bi-directional switch 34, 70 to drive a respective output voltage source such as capacitors 24, 68 and a respective corresponding load such as resistors 52, 53. It should be understood that one or more of the output windings 42, 64 might be not be isolated from the input winding 40 if the design required that the windings not be isolated.

Referring again to FIG. 7, the multi-output, multi-directional dc-to-dc power converter 10 is shown having at least a first and a second output bi-directional switch, such as FETs 34, 70, with gates 37, 72 representing their respective control terminals. Each gate 37, 72 is coupled to be responsive to drive its corresponding conduction channel into a conductive state in response to the second control signal V2 being in a first or high state and into a non-conductive state in response to the second control signal being in a second or low state. In other applications, three or more output bi-directional switches might be used with additional respective output windings.

FIG. 7 shows each input winding and output winding having a first and second terminal. The coupled inductor input winding is tightly coupled to each output winding. The input winding first terminal is connected to the first input terminal 12 and the input winding second terminal is connected to the conduction channel first terminal, such as FET drain 29. The conduction channel second terminal such as FET source 30 is connected to the second input terminal 14. The input voltage source 18 first terminal is connected to the first input terminal 12 and the input voltage source second terminal is connected to the second input terminal 14. The input winding 40 is therefore connected in series with the input voltage source 18 via the conduction channel between drain 29 and source 30 of the input bi-directional switch 28.

The first and second output bi-directional switches, FETs 34, 70 each have a control terminal, such as gates 37, 72 respectively. Each FET has a conduction channel and each conduction channel has a respective first and second terminal, such as respective drain terminals 35, 71 and respective source terminals 36, 73. The first output winding first terminal is connected to the first output voltage source at first output terminal 20. The first output winding second terminal is connected to the first output bi-directional switch conduction channel first terminal, FET drain 35. The conduction channel second terminal, FET source 36 is connected to the first output voltage source second terminal at second output terminal 22. The first output winding is therefore coupled in series with the first output voltage source and the first output bi-directional switch conduction channel, FIG. 8 provides the same circuit as FIG. 7 with a modification that replaces load resistor 53 with a battery 74 having a first and a second terminal 82, 84 respectively. The second output winding first terminal 86 is shown connected to the first terminal 82 of the battery 74 via the series combination of charging diode 76 and current limiting resistor 78. The second output bi-directional switch conduction channel first terminal, FET drain 71 is connected to the second output winding second terminal. The conduction channel second terminal, FET source 73 is connected to the battery second terminal 84. The combination of charging diode 76 and current limiting resistor 78 permit the second output winding 64 to provide charging current to battery 74. The second output winding 64 is typically designed to provide an output voltage swing that exceeds the charged battery voltage plus forward diode 76 voltage drop by an amount that permits the battery to be charged at a predetermined continuous non-damaging trickle rate during normal operation of the converter.

As shown in FIGS. 7 and 8, the first control signal V1 is coupled to the input bi-directional switch control terminal, gate 32 and the second control signal V2 is coupled to each output bi-directional switch control terminal, gates 37, 72. The input bi-directional switch 28 conduction channel between drain 29 and source 30 is driven into a conductive state in response to the first control signal V1 being in a first state, such as a high state, and into a non-conductive state in response to the first control signal V1 assuming a second state or low state. The output bi-directional switch conduction channels between drain 35 and source 36 and between drain 71 and source 73 respectively are driven into a conductive state in response to the second control signal, V2, assuming a first state, or high state, and into a non-conductive state in response to the second control signal, V2, changing to a second state or low state.

As depicted, one or more of the output voltage sources are shown as output capacitors, 24, 68; however, one or more of the output voltage sources can comprise an output capacitor in parallel with a battery or with a load, such as load resistor 52.

FIG. 8 can be interpreted to show yet another embodiment in which a blocking diode 90 is connected between the second output winding first terminal 86 and the battery first terminal 82 to enable the battery to discharge through the blocking diode 90 at as high a rate as required to support the loads on the other output windings, such as winding 42, in the event of a loss of power from the input voltage source 18 or in the event that a high transient load on the first output winding 42 is experienced. In a combination using only the blocking diode between the battery first terminal and the second output winding first terminal 86, the battery first terminal 82 is connected to the blocking diode 90 anode. The blocking diode cathode is connected to the second output winding first terminal 86. A loss of power on from the input voltage source 18 would be supported by power from the battery 74 via the blocking diode 90 to the second output winding 64 by driving the second output winding 64 in reverse.

FIG. 8 can also be used to show another alternative embodiment in which inductor 92 is added to the components thus far described along with switch 100, input voltage monitor circuit 96 and gate 98 to form a controlled directional boost regulator in series with the battery and the second output winding 64. The combination of blocking diode 90, inductor 92 and switch 100 provide the dc-to-dc converter with most of the elements necessary for a controlled directional current or boost regulator in series with the battery 74. The controlled directional current or boost regulator is shown in FIG. 8 comprising the blocking diode 90 cathode terminal connected to the second output winding first terminal 86, the inductor 92 first terminal connected to the battery first terminal 82, and the inductor 92 second terminal connected to the blocking diode 90 anode. An input voltage source monitor circuit 96 monitors the input voltage from the input voltage source at input voltage terminal 12 with respect to the return input terminal 14. The input voltage monitor circuit compares the sampled input voltage with a precision internal reference and outputs an enable signal in response to the input voltage dropping below a first threshold level and removes the enable signal in response to the input voltage rising above a second threshold level. The enable signal is fed to the first of two inputs to AND gate 98. The first clock control signal is provided to the second input to the AND gate. The output of the AND gate is either zero when the input voltage at terminals 12, 14 is above the first threshold or the output of the AND gate passes the first control signal on signal line 46 when the input voltage is below the first threshold in response to the enable signal going to a high state.

Semiconductor switch, power FET 100, is shown having a conduction channel with a first and second terminal, such as drain 102 and source 104, and control terminal, gate 106. The semiconductor switch 100 conduction channel first terminal, drain 102 is connected to the inductor 92 second terminal and to the blocking diode 90 anode. The semiconductor switch 100 conduction channel second terminal, source 104 is connected to the battery second terminal 84. The semiconductor switch 100 control terminal, gate 106 is driven by the enabled first control signal V1 from the output of the AND gate 98. Waveforms above the left input to input voltage source monitor circuit 96 schematically depicts a decline of the input voltage below a first threshold level. The waveform above the output of the input voltage source monitor circuit 96 depicts the corresponding change in its output state of monitor circuit 96 to a high on the enable signal line in response to the input voltage passing below the first threshold. The waveform above the output of the AND circuit characterizes the output of the AND gate as it begins to copy the first control signal V1 in response to the enable signal going to a high state. The semiconductor switch begins to modulate the voltage at the anode of the blocking diode 90 in response to the copied first control signal V1. The voltage on voltage source capacitor 68 rises slightly as power is provided by the battery 74 to the second output winding 64 through the blocking diode 90 to support continued operation of the dc-to-dc converter in response to the input voltage dropping below the first threshold.

The inductor 92, in combination with the blocking diode 90, the third bi-directional switch 100, and capacitor 68 comprise a conventional boost converter which is driven by the clock circuit V1 signal when coupled through the AND gate 98 in the absence or failure of the input voltage source.

FIG. 9 shows a version of the invention bi-directional dc-to-dc power converter or multiple output multi-directional power converter 110 with supporting circuitry for closed loop bi-directional operation. In the circuit of FIG. 9, the traditional flyback output rectifiers are replaced by power FET switches 112, 114 (or other bi-directional switches). The input bi-directional switch, input power FET 116, is driven by the first control signal V1 from the DRV output of PWM 117, a UC 3842. The UC 3842 is a current mode Pulse Width Modulator Control Integrated Circuit available from the Unitrode company of Merrimack, N.H. 03054, as well as from other suppliers. The generation of the control signals can be accomplished by many alternative circuit embodiments including those which employ discrete analog and/or digital circuitry, microprocessors, gate arrays, digital signal processors, etc. Information about and availability of power FETs for use in the in circuits shown may be obtained from Motorola's Technical Information Center at Phoenix, Ariz. The source of the input bi-directional switch, input power FET 116 is connected to ground through current sense resistor 119. Integrated Circuit 117 is shown powered from an Auxiliary Supply which is customary for reliable starting and control. An Auxiliary supply might initially comprise a separate transformer rectifier set and three terminal regulator to supply VCC, the transformer primary being coupled to a mains supply. In the alternative, the Auxiliary Supply might use a separate battery with continuing power being supplied by the converter after initial power up.

Figure 4:
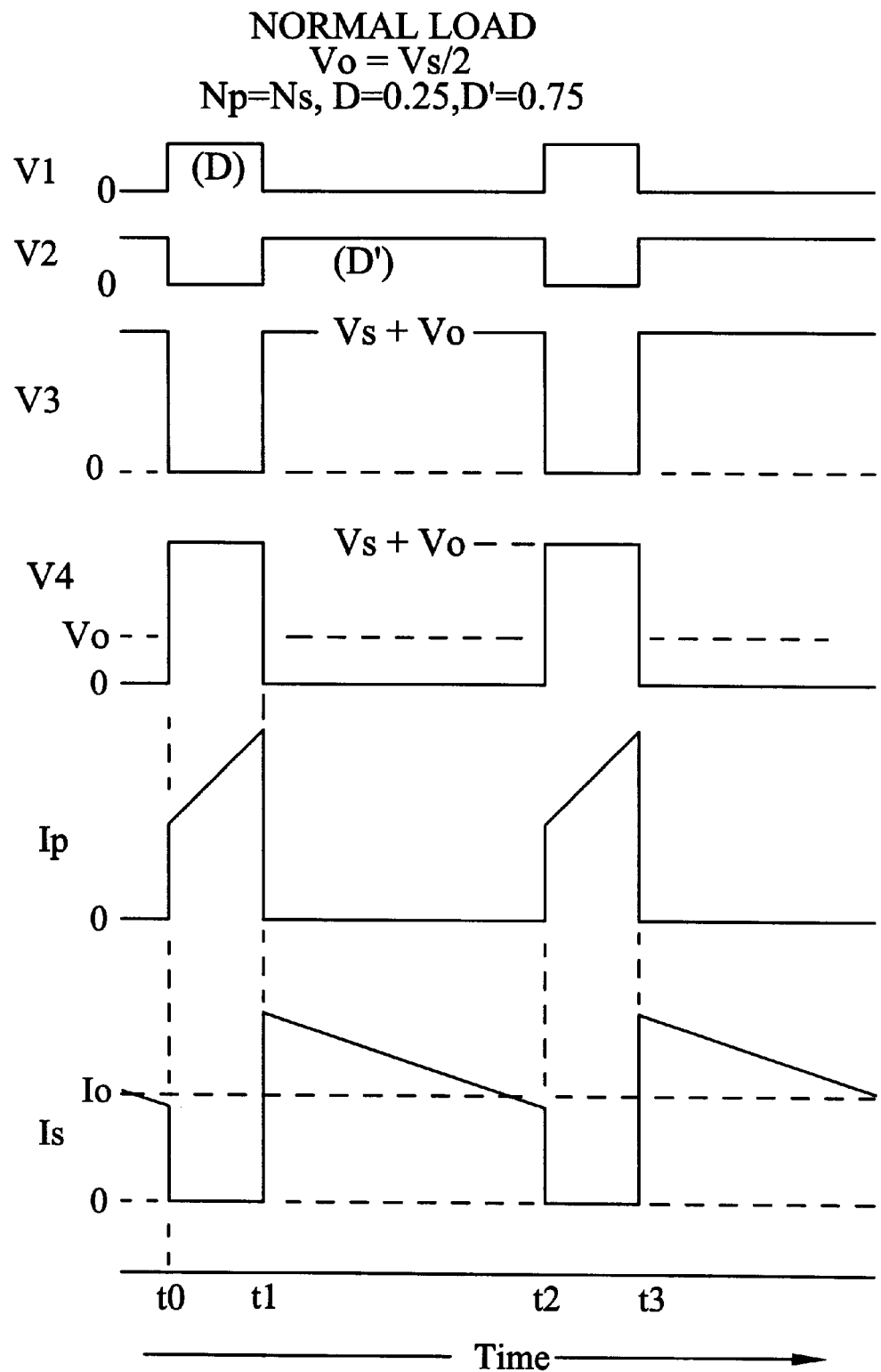
FIG. 4 is a timing diagram for the bi-directional dc-to-dc power converter operating with a normal load and with a 25% duty cycle.
Figure 5:
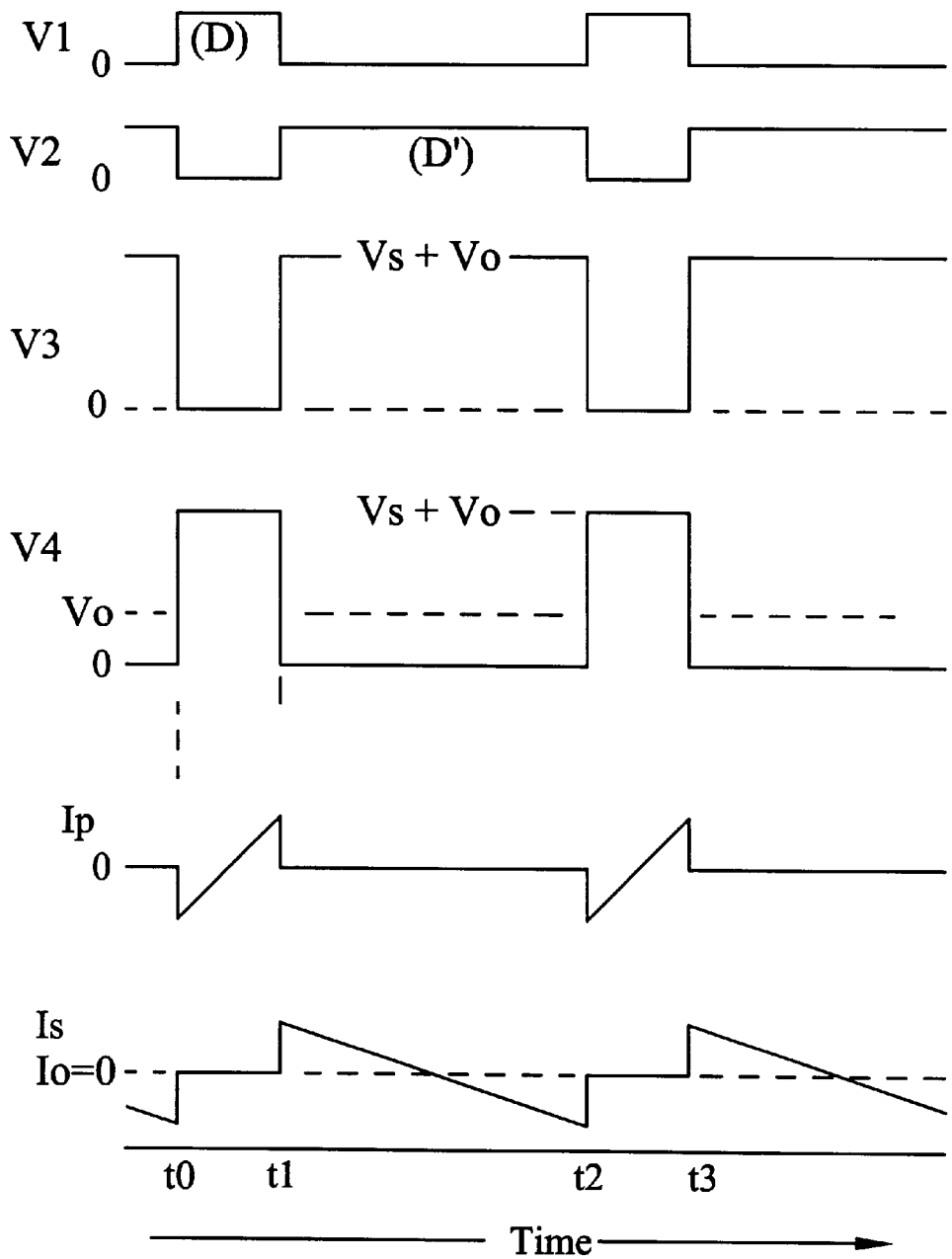
FIG. 5 is a timing diagram for the bi-directional dc-to-dc power converter operating with no load and with a 25% duty cycle.

The top two waveforms of FIGS. 2–5 and FIGS. 6a–6c each show the switching characteristics of the first and second control signals V1 and V2. FIGS. 2 and 3 depict the waveform relationships that can be expected if the duty cycle is 50%. FIGS. 4 and 5 show the waveforms resulting from a 25% duty cycle. FIGS. 2 and 4 show the waveforms with a normal load. FIGS. 3 and 5 show the waveforms with the load reduced to zero.

The waveform for V3 in each of FIGS. 2–5 and in FIGS. 6a–6c shows the general shape of voltage at the drain of the input bi-directional switch 28 in FIGS. 7 and 8 and the input bi-directional switch 116 labeled V3 in FIGS. 9 and 10. Vs is the voltage of the input voltage source applied between the first and second input terminals 12 and 14.

The waveform for the voltage V4 represents the general shape of the voltage waveforms at the drain of the first output bi-directional switch 34 of FIG. 1 and FIG. 7, FIG. 8 and at the drain of the first output bi-directional switches 112 in FIGS. 9 and 10. The voltage V5 has the same shape as the Voltage V4. Voltage V5 appears at the drains of the second output bi-directional switches 70 of FIGS. 7 and 8, and at the drain of the second output bi-directional switch 114 of FIG. 9.

Referring to FIG. 9 and FIG. 10, waveform for the current Ip in FIGS. 2–5 and FIG. 6a–6c represents the current into the drain of the input bi-directional switch 116 as it passes through the primary 40 of the coupled inductor 60. The waveform Is represents the current in the output windings or into the drains of the first and second output bi-directional switches 112, 114. The waveform Io represents the level of the output current through the load resistors 120a, 120b. Io is the average of the waveform Ic.

FIGS. 2 and 4 and the circuit of FIG. 9, show that as V1 assumes a high state at time t0, the input bi-directional switch 116 turns on hard and current Ip experiences an initial step rise followed by a ramped rise ending at time t1. The initial step in current is a result of flux or energy expressed in ampere-turns remaining in the core at the conclusion of the previous power cycle. In the continuous mode, under normal load conditions, energy of some magnitude, supported by the composite sum of the ampere-turns product that depends on the current to the load from the secondary or output windings 123, 124 and the ampere-turns product from magnetizing current, remains in the core at the commencement of any power cycle. At t0, all of the output bi-directional switches 112, 114 turn off interrupting any and all currents flowing in the output windings. At that instant, the sum of all ampere-turn products in the output windings must be picked up instantaneously by the input winding and the input bi-directional switch 116. The ramped current that follows t0 is due to a normal increase in magnetizing current that results from the primary supporting the input voltage source Vs through input bi-directional switch 28.

The bottom waveform in FIG. 2 and FIG. 3 represents the capacitor current Ic which is essentially equal to the Is current, except that the average value of the capacitor current is substantially zero. The voltage across the load is constant, so the current through the load is constant. The time-varying excursions of the Is current must be absorbed by the output voltage source, i.e. capacitors 122a and 122b. The capacitors are designed to have sufficient capacitance to maintain variations in output voltage with a predetermined range, while the area under the Ip curve is proportional to the total input power.

Referring now to waveforms Ip and Is in FIGS. 3 and 5 and to the circuit of FIG. 9, as the load is removed, Io goes to zero. The current Ip, shown entering the dot end of the transformer primary winding, is the result of magnetizing current developing in the primary 40 during each power cycle during the interval t0 to t1. Waveform Is jumps to an initial positive value at t1 in response to the input bi-directional switch opening and the output bi-directional switch(s) closing. The polarity of the voltage on the output windings 123, 124 switches and current continues to enter the dot on the secondaries. The magnetizing energy in the core at t1 that is supported by the ampere-turn product in the primary is transferred to an equivalent ampere-turn product in the output windings 123, 124 as the switches transfer. The value of Is ramps down during the interval t1 to t2 as energy in the core is used to support the voltage across the output voltage source(s) capacitors 122a, 122b. Waveforms Ip and Is both depict currents going to negative values to support the development of negative flux in the core of the transformer. The current Is decreases to a negative value during the interval t1 to t2 because the first and second output switches are on and because the output voltage sources, capacitors 122a and 122b, are charged to the output voltage, and therefore each capacitor drives its respective secondary winding so as to produce negative flux supported by negative ampere-turns as time t2 is reached. The negative ampere-turns in the core result in the primary winding delivering current from the input winding 40 to the voltage source 12 as the input bi-directional switch 116 is turned on at t2.

If the duty cycle of input power switch 116 is described by D, then the duty cycle of the output FET switches 112, 114 is described by D'. Whenever the input bi-directional switch 116 is on, the first and second output bi-directional switches 112 and 114 are off. Whenever the input power switch 116 is off, the first and second output bi-directional switches 112 and 114 are on.

Synchronous rectifier operation is quite different than bi-directional switch operation in the following way. If switches 112 and 114 were to be used as synchronous rectifiers, they would be switched on and off in a manner that would make them emulate rectifiers. Operating as synchronous rectifiers, no current would be permitted to flow from the capacitors 122a, 122b to the output winding(s) 123, 124 during any portion of the power cycle. Conduction in only one direction would be supported or permitted.

Under full load, the operation of the multiple output multi-directional power converter of FIG. 9 is the same as that of the standard continuous conduction flyback converter utilizing synchronous rectifiers as shown in the waveforms of FIG. 2 and FIG. 4. However, under light load or no load conditions, the operation is considerably different from that of a standard flyback in that operation is forced to remain in the continuous conduction mode as shown by the Ip and Is waveforms in FIGS. 3 and 5. The discontinuous mode, where flux in the core is allowed to reach zero before t0, and the critical conduction mode where the flux in the core is allowed to just barely reach zero at t0, are modes that are not allowed.

Referring to the no load waveforms of FIG. 3 and FIG. 5, and the circuit of FIG. 9, it can be seen that the converter is in continuous conduction at all times with no load being serviced. By the end of the power "on" cycle of the input bi-directional switch 116, i.e. interval t0 to t1, energy in the form of magnetizing flux supported by ampere-turns in the input winding 40 has been stored in the core. The core then transfers the stored energy during interval t1 to t2 into capacitors 122a, 122b through the first and second output switches 112, 114, the current passing from the source to the drain in each case. At the instant the current Is crosses zero in FIGS. 3 and 5, there is no energy stored in the core. However, since the secondaries are still connected to capacitors 122a and 122b which are charged to their normal output voltage and the output switches 112, 114 are still on, the normal output voltages on the capacitors 24, 68 are applied to the first and second output windings through the first and second output switches 112, 114 allowing current to increase in the reverse direction from the drain to source in each case from an Is=0 value until t2.

The development of negative magnetizing current results in the development of negative flux in the core. The negative magnetizing flux is supported by negative ampere-turns in the primary as the output switches 112, 114 are turned off driving the current in the output winding 123, 124 to zero. If a load current had been supported by the output winding, as the output switch was turned off, the ampere-turns product due to the load current would be added to the no-load ampere-turn product, and the composite sum of the products would also be picked up by the input bi-directional switch 116 as an initial positive or negative step in Ip, observable at times t0 and t2 of FIG. 3 and FIG. 5.

Referring to the transitions at t2 in FIGS. 2–5 and the circuit of FIG. 9, at t2, the V2 signal goes low and turns off the output bi-directional switches 112, 114. An instant before turn off, the voltage at V3, the drain 118 of the input bi-directional switch, is at a level of Vs+Vo which, if D=0.5 and Ns=Np, is equal to twice the value of the input voltage source Vs. As the current in the output windings 123, 124 drops to a zero value, the flux in the coupled inductor 60 causes the polarity of the voltage across the primary winding to reverse due to the flow of current out of the dot at the top of the input winding. The result of the switch in polarity an instant before the input bi-directional switch is turned on is that the voltage across the conduction channel is reduced to a near zero value, thus reducing the switching loss in the input bi-directional switch 116 as the current in the primary 40 increases through the conduction channel. The reduction in switching loss is obtained by a slight delay between the turn off of the output switches and the turn on of the input switch.

A similar reduction in switching losses is enjoyed by the output bi-directional switches as the input bi-directional switch 116 is turned off at t1 and t3. The voltage at V4, the drains of the output bi-directional switches 112,124 drops to near zero as shown at t1 and t3 thereby reducing switching losses in the respective output bi-directional switches as current flows up from the analog ground "A" into the source of each switch, out of its drain and into the dot at the bottom of each output winding 123, 124. In this case the reductions in switching losses are obtained by a slight delay between the turn off of the input switch and the turn on of the output switches.

As shown in FIG. 9, the first control signal V1 from the DRV output of PWM 117 drives the primary of pulse transformer 125 through capacitor 126. The secondary of transformer 125 inverts the drive signal V1 thereby forming the second control signal V2. The second control signal V2 is then coupled to the gates of output bi-directional switches 112, 114 via delay resistor 128.

Overlap switching control is provided by operation of the following components. Reactor 130 provides a delay in the turn on time of input bi-directional switch 116. As the voltage V1 transitions from the DRV output from a low to a high, a small amount of capacitance between the gate and the source of FET 116 delays the rise in voltage of the gate.

The reactor 130 requires a short time in which to saturate after which it allows drive current from DRV to charge the gate-to-source capacitance of switch 116, after which time the input bi-directional switch 116 turns on. The reactor is typically of amorphous magnetic alloy, and such reactors are typically available from Allied Signal in Parsippany, N.J., or from Toshiba and others. As the state of the DRV signal is reversed, diode 150 provides minimum delay in turning the input bi-directional switch off. It is possible to avoid the need for the delay at turn-on of switch 116 by turning off the output bi-directional switch earlier in the period. However, the performance of the power converter (particularly the cross-regulation between outputs) will not be as good as it is with the second control signal's duty ratio maximized to be as close as practical to the complement of the first control signal. Maximizing the conduction time of the secondary switches improves the cross-regulation and transient response of the outputs. By this same argument, timing methods which do not maximize the conduction times, although perhaps simple and economical, can be used but with some degradation in performance.

Delay resistor 128 in combination with the gate-to-source capacitance of the output bi-directional switches 112, 114 provides a short delay in the turn-on of the switches since the rate of charge is a function of the resistance of resistor 128 and the amplitude of the voltage swing of the secondary of the pulse transformer 125. The amplitude of the voltage swing is clamped by diode 134 at a predetermined peak level. Resistor 136 provides a dc restoring discharge path for coupling capacitor 137. The turn-off time of the output switches is reduced by operation of switching diode 138. As the output of the secondary of pulse transformer 125 switches from a high to a low, the gate-to-source capacitance which had been charged through delay resistor 128 is rapidly discharged through switching diode 138, capacitor 137 and the secondary of pulse transformer 125.

The delay provided by the reactor 130 in turning the input switch on in combination with the rapid turn off of the secondary switches provided by switching diode 138 insures that the output switches will be off before the input switch is on. The delay provided by the delay resistor 128 is set to exceed the delay through diode 150 at the time the input switch 116 is turned off and the output switches are turned on. The longer delay provided by the delay resistor 128 than the delay of the diode 128 insures that the output switches 112, 114 will not turn on before the input switch 116 is turned off.

The output voltage from the output voltage source 122a is shown monitored by reference circuit 140. The reference circuit senses the output voltage via the divider formed by resistors 142 and 144. As the sensed voltage exceeds an internal reference level, the reference circuit 140 provides a current demand at its input C, the current passing through resistor 148 and forward biasing the LED 150 in opto-coupler 152. The greater the sensed voltage excursion, the greater the current demand at the input C of reference circuit 140 and the larger the number of photons that will be produced by LED 150.

The conductance of NPN phototransistor 154 in the opto-coupler is increased by additional photons per unit time. The NPN phototransistor 154 in the opto-coupler turns on, pulling down the COMP input to the PWM 117 via resistor 155 thereby causing a reduction in the period of D and increase in the duration of D'. A decrease in the sensed voltage at input R to the reference circuit operates to produce the reverse of the aforementioned occurrences in the characterized feedback sense and control.

The combination of the components within phantom block 156 and 158 therefore provides an embodiment of a means for sensing the output voltage Vo, comparing a portion of the output voltage at the R input of reference amplifier 140 with a precision internal reference voltage, and providing an error voltage into the COMP input of the control IC 117 to increase or decrease duty ratio of the first and second control signals to maintain the output voltage within a predetermined range.

The integrated circuit 117 provides the required clock circuit with a fixed period set by the values of resistor 113 and capacitor 115, and an internal latch which, when set, drives the first control signal to a high state with a high on the DRV output thereby turning on the input bi-directional switch 116.

The IFB input to the integrated circuit 117 receives a current sense voltage at its IFB input from current sense resistor 119 as current passes through the sense resistor.

The combination of the circuits within phantom blocks 156 and 158 provides a control circuit means for providing a clock signal with a fixed period to repeatedly set the output of an internal latch. The output of the latch drives the first control signal V1 high. The components within phantom block 156 sense the output voltage Vo of the converter. Reference amplifier 140 compares a portion of the output voltage with a precision internal reference voltage to provide an error voltage.

The error voltage is conditioned and coupled by the opto-coupler 152 to provide the error voltage to an internal comparator within the integrated circuit 117. The current rise in the input winding is converted by the sense resistor 119 into a ramp voltage. The internal comparator in IC 117 compares the ramp voltage with the error voltage and provides a reset signal to reset the latch to a zero state in response to the ramp voltage exceeding the error voltage. The zero set output of the latch drives the first control signal low turning off the input bi-directional switch 116. The internal latch is then set to the one state on receiving the next clock signal.

Resonant Transitions

FIG. 10 shows an alternative bi-directional power converter configured to provide operation in the resonant transition conduction mode. The object of operation in the resonant transition mode is the virtual elimination of switching losses in the input and output switches by turning the input and output switches 116, 112 on and off at times when there is virtually no voltage across the switch.

The circuit operation of FIG. 10 will be described with reference to the waveforms of FIGS. 6a–6c. FIGS. 6a–6c are three timing diagram charts for each of three load conditions for the bi-directional dc-to-dc power converter of FIG. 10. The period of the first and second control signal is adjusted to provide resonant transitions for both the input and output bi-directional switches 116, 112.

In each of FIGS. 6a–6c, the V1 and V2 control signals indicate that the duty ratios are substantially 50% with the total period diminishing with the load current characterized by the peak value of Ip on each of the charts. The value of the input voltage Vs is the same in each case. The peak amplitude of the voltage at V3, the second terminal 160 of the input winding 40 is the same on each of the charts. The peak swing of the voltages on the secondary winding V4 is the same on each of the three waveforms for V4.

In addition to coupled inductor 60 having a primary or input winding 40 and a secondary or output winding 123, the circuit of FIG. 10 uses the same pulse transformer 125 as shown in FIG. 9 with the same function of providing a second control signal V2 as the complement of control signal V1 from the output 162 of integrated circuit 164. A current sense transformer 170 is shown having a primary sense winding 172, a secondary sense winding 174 and an output signal winding 176.

The opto-coupler 152 is shown providing the same function as in FIG. 9. The collector of NPN phototransistor 154 in the opto-coupler is connected to the Auxiliary Supply. The function and operation of the resistor divider pair of resistors 142 and 144 is the same as in FIG. 9. The values are established such that when output voltage Vo is at its proper voltage, the voltage into pin R of integrated reference amplifier 140 is exactly 2.5 volts, or the value of a precision reference. As the output voltage rises above its proper value, integrated circuit 140 detects and amplifies the error and produces a current demand at pin C. Resistor 148 limits the current demand. The current demand passes through the photo diode 150 and the photons produced are coupled to the base of NPN phototransistor 154 to turn it on. Resistor divider 182, 184 couples a small rise in voltage into the VFB input 186 of the integrated circuit 190, a UC 3852 Power Factor Correction Circuit. The UC 3852 is a pulse width modulator adapted for critical conduction flyback operation, also available from the Unitrode Corporation mentioned above.

Referring to FIG. 6a, as control signal V1 transitions to a positive value at t0, input bi-directional switch 116 turns on. The conduction channel of switch 116 connects the second terminal of the input winding 40 of transformer 60 to return 14. At this time, the output bi-directional switch is open. Current begins to ramp up in the primary as indicated by the waveform Ip at t0. The rate of rise is limited by the self-inductance of the primary or input winding 40 and the applied input voltage Vs.

The resistor divider formed by resistors 188 and 189 provide a positive bias voltage into the ISNS input 191 of integrated circuit 190. Referring to FIG. 6a, during the interval from t0 to t1, the input current Ip passes into the dot and through the first sense winding 172 of current sense transformer 170. The second sense winding 174 branch is open during this interval. The lower half of signal winding 176 is terminated by scaling resistor 189 via forward biased signal diode 192. Negative ramp voltage Va develops across this lower half of signal winding 176 in response to the current Ip increasing in first sense winding 172. The current in the lower half of winding 176 is inversely proportional to the ratio of turns in the first sense winding 172 to turns in the lower half of the signal winding 176.

The current thus produced passes through resistor 189 and signal diode 192. Voltage Vc becomes more negative as a function of the current in the lower half of the signal winding scaled by the resistance value of the resistor 189. Thus the voltage across resistor 189 results in a negative going ramp, shown as the bottom wave form in FIG. 6a as voltage Vc, at the ISNS input 191 of FIG. 10.

During the interval from t1 to t2, the output current Is passes into the dot at the bottom of the second sense winding 172 of current sense transformer 170. The first sense winding 174 branch is open during this interval, but the upper half of signal winding 176 is terminated by scaling resistor 194 via forward biased signal diode 193. A positive ramp voltage Vb develops on the upper half of the signal winding 170 during the interval from t1 to t2.

The values of resistor 188, 189 are calculated to establish a quiescent operating voltage at the ISNS input 191 slightly above zero volts such that when current in the first or second sense windings goes to zero, the voltage into the ISNS input 191 crosses from a negative signal value to a few millivolts above zero volts. This operation point is important because a zero volt crossing resets integrated circuit 190, the UC 3852 starts the next power cycle at a point where there is virtually no current in the input bi-directional switch.

The UC 3852 is a controlled on-time PWM that has a clock circuit or timer with an on-time that can be modulated by an external voltage. The clock period is programmed by external resistor 194 from the ISET terminal to GND. A timing capacitor 195 connected from the RAMP terminal to the GND terminal of the UC 3852 sets the on-time in conjunction with the voltage at the COMP terminal. Typical values for the timing capacitor range from 100 pF to 1 nF.

Referring again to FIG. 6a, at t1, first control signal V1 goes low turning off the input bi-directional switch 116 via speed-up diode 150. V2 goes high turning on the output bi-directional switch 112 with the small delay provided by resistor 128 and the gate-to-source capacitance of output bi-directional switch 112. The turn off of switch 116 is very fast and can be substantially lossless. The turn off of switch 116 and the interruption of current into the dot on winding 40 induces a polarity change on the secondary winding driving the voltage at V4, the drain of switch 112, to a level one diode drop below the analog ground "A" where it is clamped by the body diode of switch 112 until the gate voltage of switch 112 rises turning the switch 112 on. Switch 112 thereby turns on at t1 with virtually no voltage across it thereby avoiding switching losses at turn on.

In the interval between t1 and t2, current in the secondary ramps down as energy is delivered from the secondary winding through the output bi-directional switch to the output capacitor 122a and load resistor 120a.

At the conclusion of the interval t1–t2, at t2, the period of the V2 term is sufficient to allow the secondary current Is and the current in the output signal winding IT2S through register 189 to go to zero or to a valve sufficiently low to allow the voltage at Vc into the ISNS input 191 to rise a few millivolts positive above ground as shown by the waveform Vc on FIGS. 6a–6c. The second control signal V2 then goes low turning off the output bi-directional switch 112 at a time when the current passing through the switch has dropped through zero and has gone slightly negative as a result of voltage applied by the output voltage source capacitor 122a. At this time output bi-directional switch 112 is turned off very quickly, resulting in an essentially lossless transition.

The slight amount of negative current that is permitted to develop in the output winding is adjusted by the control process to be sufficient to cause the polarity of the voltage on the primary winding to reverse as current in the secondary is interrupted by the turn off of the output bi-directional switch 112. Interruption of current in the secondary is adjusted by the delays and operating point to switch the polarity of the voltage across the primary, driving the voltage on the drain of input bi-directional switch 116 negative until it is clamped by the body diode of input bi-directional switch 116 slightly before the first control signal overcomes the delay resulting from reactor 130 and the gate-to-source capacitance of switch 116, turning on switch 116 at t2. The turn on of switch 116 occurs at a time where there is virtually no current passing through the switch 116 and there is no voltage across the switch 116, thereby again resulting in very low switching losses.

The circuit of FIG. 10 is therefore not only a bi-directional flyback converter such as the converter of FIG. 9, but is also essentially a critical conduction variable frequency flyback utilizing a modified synchronously rectified secondary. In operation, the turn-off of the synchronous output FET, the output bi-directional switch 112, is delayed past the zero current point in order to build up a small amount of reverse energy in the core of the coupled inductor 60, at which time the output bi-directional switch 112, is turned off. The reverse energy in the core then causes a lossless transition of the input FET, input bi-directional switch 116, at which time its gate drive is applied. Current then ramps up in the primary, the input winding 40 through the input bi-directional switch 116 in a normal manner until terminated by the control signal V1 driving the gate low.

Forward energy in the core of the coupled inductor 60 then transfers to the secondary through the output bi-directional switch 112 in a lossless transition at which time the gate drive, V2, to switch 112 goes high.

As the current through output bi-directional switch 112 declines through zero and begins to reverse direction, the gate drive, V2, to turn the output switch off is delayed as described above and the cycle is repeated. Bi-directional energy transfer is used to provide resonant transition between the secondary and primary conduction of the output winding 123 to the input winding 40.

Figure 11:
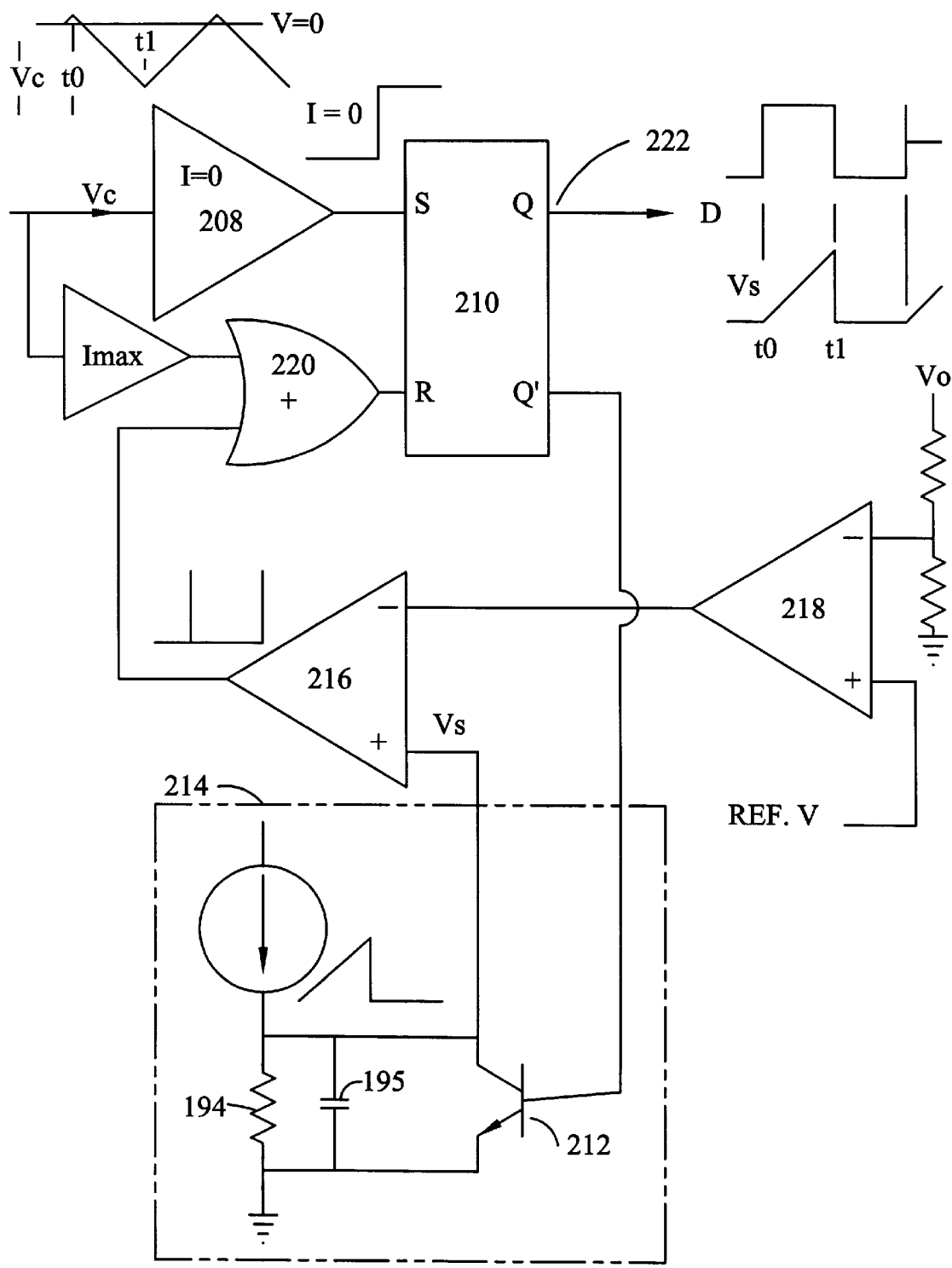
FIG. 11 is a simplified embodiment of a control means for a sensing the coupled inductor input and output winding currents and the output voltage of the bi-directional converter while adjusting the clock frequency to provide operation in a resonant transition mode and to adjust the output voltage of the bi-directional converter to a predetermined level.

The control means characterized by the circuitry in blocks 204 and 206 maintains operation in the resonant transition mode automatically. FIG. 11 shows a functional embodiment of a resonant transition control means for sensing the coupled inductor input and output winding currents and the output voltage and for adjusting the clock frequency to provide operation in a resonant transition mode and to adjust the output voltage to a predetermined level. In operation, the resonant transition control means provides a reduction in frequency in response to an increase in load and an increase in frequency in response to a reduction in load. Switching by the input bi-directional switch 112 of the input winding occurs at near zero voltage at t0 and t2 as a result of reverse current into the output winding from the output voltage source. Losses are minimized at the turn off of the input bi-directional switch 116 at t1 by sharpening the fall of the voltage on the gate by use of speed-up diode 150. As in the case of FIG. 9, the components within phantom block 156 sense the output voltage Vo of the converter. Reference amplifier 140 compares a portion of the output voltage with a precision internal reference voltage to provide an error voltage. As shown in FIGS. 10 and 11, the error voltage is conditioned and coupled by the opto-coupler 152 to provide the error voltage to an internal error signal amplifier 218 within the integrated circuit 190.

FIG. 11 is shown as the sense voltage Vc has risen to zero volts and the input threshold amplifier 208 has switched its output from a low to a high, setting the R-S flip-flop (FF) 210 output Q to the one or high state. The Q' output goes low turning off the NPN transistor 212, thereby allowing the ramp generator 214 to provides a ramp to the non-inverting input of comparator 216. The comparator receives an error signal from an error signal amplifier 218, at the comparator's inverting input. The error signal rises or falls depending on whether the output voltage is below or above the flyback output voltage Vo operating design range. The comparator 216 drives the reset terminal of the R-S FF 210 via OR gate 220 to reset the FF at t1.

At the instant the FF resets at t1, the Q term goes low and the Q' or V2 term goes high. The Q' output of the R-S FF is the second control signal V2 which when high, turns on the output bi-directional switch 112, which allows the current in the secondary to ramp down and the voltage Vc to rise to zero. At t1, the Q output of FF 210 goes low to turn off the input bi-directional switch 116. At the same time, the Q' output goes high and turns on the NPN transistor 212 and discharges the capacitor 195. The capacitor remains discharged until the FF is once again set by the voltage Vc rising through zero. The overall period will therefore vary to accommodate the rise and fall of the output voltage Vo.

A low first control signal results in a high second control signal, V2, via transformer 125. A high V2 term turns on the output bi-directional switch 112 allowing the current in the secondary to ramp downward. The current in the output winding continues to ramp downward until voltage Vc crosses zero volts at the input of the input threshold amplifier 208. As the current in the output winding ramps downward, the voltage Vc ramps upward toward zero.

An increase in the error signal into the error signal amplifier 218 reduces the error signal out of error signal amplifier 218 thereby reducing the time required for the internal ramp generator to reset the R-S FF, thereby also reducing the on time of the first control signal. A reduction of the error signal into the error amplifier 218 produces the reverse result.

Advantages of the Fixed Frequency Single and Multi-Output Regulator

The following advantages are provided by the multiple output multi-directional power converter of applicant's invention.

(1) The efficiency of the multiple output multi-directional power converter is increased by eliminating the necessity for bleeder resistors 1.

(2) The cross regulation is greatly improved. If one output is run at full load and a second output is run at no load, then excess energy stored on the second output, i.e. the energy stored in capacitor 68 in the case of FIG. 7 or capacitor 122b in the case of the circuit of FIG. 9, will recirculate back to the first output supported by capacitor 24 in the case of FIG. 7 or capacitor 122a in the case of the circuit of FIG. 9. Since the first and second output switches, FETs 34, 70 in the case of FIG. 7 and FETs 112, 114 in the case of FIG. 9 are both on for the full D' portion of the cycle, the voltage across capacitors 122a and 122b will much more approximate the voltage determined by the turns ratio of their respective winding than in a standard flyback.

(3) The high line, no load operation is improved since the duty cycle is a function of input voltage and essentially independent of load. Extremely narrow duty cycles are avoided.

(4) The load transient response is improved since the converter always operates in the continuous mode, never discontinuous as a standard flyback, which simplifies the control loop. In addition, whenever the load on any output goes to zero, any excess energy can actively be recirculated from that output to another output or input.

(5) The output voltage deviation due to load transients is further reduced in that during the portion of the cycle when the first and second output switches, FETs 34, 70 in the case of FIG. 7 or FETs 112, 114 in the case of FIG. 9 are both on, any voltage unbalance between capacitors 24 and 68 or 122a and 122b causes a corrective current to flow due to the operation of the coupled inductor 60 which re-balances the outputs on a sub cycle basis. If a heavy load is instantaneously applied to the output supported by capacitor 122a, energy will flow out of capacitor 122b to help hold up the voltage across capacitor 122a;

(6) The multiple output multi-directional power converter simplifies battery backup operation. If a battery of equal voltage to output 1 were placed in parallel with output 1 and the input power source were removed, output 2 would continue to supply power to its load by energy flowing into output 1 from the battery. In the multiple output multi-directional power converter, it is possible to back up a plurality of outputs by placing a voltage source across any output.

All of the above advantages accrue from the fundamental feature of the multiple output multi-directional power converter, namely, forcing the continuous conduction mode at all times by recirculating the energy.

Advantages of the Variable Frequency Single-Output Resonant Mode Converter

The following advantages are provided by the variable frequency single-output resonant mode converter embodiment of the invention.

(1) The variable frequency single-output resonant mode converter reduces switching losses particularly on bi-directional switch turn on which would allow operation at higher frequencies.

(2) The need for a bleeder load under no load operation is eliminated while maintaining good transient response. The reverse energy flow provides the same effect as a bleeder but without the constant power loss of a bleeder load.

(3) The variable frequency circuit does not exhibit frequency run away at no load as do some variable frequency critical conduction flyback regulators.

(4) The losses at minimal load are minimized.

Application of the Invention to Other Topologies

Due to the similarity of operation to other switch-mode dc-to-dc converters, the invention may be used with other switched-mode topologies, such as forward, push-pull, half bridge, full bridge and others, including their derivations and combinations. Detailed implementation should be relatively simple, given the descriptions discussed herein. FIG. 9 is an example of a quite useful flyback topology in which this invention is applied with all of the advantages described earlier herein.

It should be obvious from the above-discussed apparatus and embodiments that numerous other variations and modifications of the apparatus and embodiments of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A bi-directional power converter having an input coupled to an input voltage source and an output coupled to a first output voltage source comprising:

an input bi-directional switch, a FET, having a conduction channel and a control terminal, and an output bi-directional switch, a FET, having a conduction channel and a control terminal, a coupled inductor having an input winding and an output winding, the coupled inductor input winding being coupled to the output winding, the coupled inductor input winding being connected in series with the input voltage source and the input bi-directional switch conduction channel, the coupled inductor output winding being connected in series with the first output voltage source and the output bi-directional switch conduction channel, a clock circuit providing first and second control signals, each control signal having a first and second state, the second control signal having a state that is the complement of the first control signal, the first control signal first state duration followed by the second control signal first state duration forming a substantially fixed clock period, the first control signal being coupled to the input bi-directional switch control terminal and the second control signal being coupled to the output bi-directional switch control terminal, the input bi-directional switch conduction channel being driven into a conductive state in response to the first control signal being in a first state and into a non-conductive state in response to the first control signal being in a second state, the output bi-directional switch conduction channel being, driven into a conductive state in response to the second control signal being in a first state and into a non-conductive state in response to the second control signal being in a second state.

2. The bi-directional dc-to-dc power converter of claim 1 wherein the first output voltage source further comprises an output capacitor.

3. The bi-directional power converter of claim 1 wherein the first output voltage source further comprises an output capacitor in parallel with a load.

4. The bi-directional power converter of claim 1 wherein the clock circuit provides a clock signal with a substantially fixed period to set the output of a latch circuit to a first state, the output of the latch circuit driving the first control signal high, a first amplifier circuit that senses the output voltage of the converter, and compares a portion of the output voltage with a precision internal reference voltage to provide an error voltage, a second amplifier circuit that senses the input winding current rise in the input winding as a ramp current voltage, a comparator circuit that compares the ramp current voltage with the error voltage, and provides, a reset signal to the latch circuit to set the latch circuit output to a second state in response to the ramp current voltage exceeding the error voltage, the second state output of the latch circuit driving the first control signal low, the latch circuit output being set to the first state on receiving the next clock signal.

5. The bi-directional power converter of claim 4 wherein the coupled inductor has a first and a second output winding, each respective output winding being coupled through a respective bi-directional switch to a respective output voltage source, and wherein, each respective output voltage source further comprises a charged output capacitor.

6. The bi-directional power converter of claim 4 wherein the coupled inductor has a first and a second output winding, each respective output winding being coupled through a respective bi-directional switch to a respective output voltage source, and wherein, each respective output voltage source further comprises a charged output capacitor in parallel with a respective load.

7. The bi-directional power converter of claim 4 wherein the coupled inductor has a first and a second output winding, and wherein, each respective output winding is isolated from the input winding, each respective output winding being coupled to a respective output bi-directional switch conduction channel to drive a respective output voltage sources.

8. The bi-directional power converter of claim 4 wherein the coupled inductor has a first and a second output winding, and wherein, each respective output winding is isolated from the input winding, each respective output winding being coupled to a respective output bi-directional switch conduction channel to drive a respective output voltage source, each respective bi-directional switch control terminal being coupled to be responsive to drive its corresponding conduction channel into a conductive state in response to the second control signal being in a first state and into a non-conductive state in response to the second control signal being in a second state.

9. The bi-directional power converter of claim 1 wherein the coupled inductor has a first and a second output winding, each respective output winding being coupled through a respective bi-directional switch to a respective output voltage source.

10. A multi-output, multi-directional power converter having an input coupled to an input voltage source comprising:

an input bi-directional switch, a FET, having a conduction channel and a control terminal, and at least a first and a second output bi-directional switch, FETs, each having a conduction channel and a control terminal, a coupled inductor having an input winding and at least two output windings, the coupled inductor input winding being tightly coupled to each output winding, the coupled inductor input winding being coupled in series with the input voltage source and the input bi-directional switch conduction channel, each coupled inductor output winding being coupled in series with a corresponding output voltage source and its respective output bi-directional switch conduction channel, a clock circuit providing a first and second control signal, each control signal having a first and second state, the second control signal having a state that is the complement of the first control signal, the first control signal first state duration followed by the second control signal first state duration forming a substantially fixed clock period, the first control signal being coupled to the input bi-directional switch control terminal and the second control signal being coupled to each respective output bi-directional switch control terminal, the input bi-directional switch conduction channels being driven into a conductive state in response to the first control signal being in a first state and into a non-conductive state in response to the first control signal being in a second state, each respective output bi-directional switch conduction channels being driven into a conductive state in response to the second control signal being in a first state and into a non-conductive state in response to the second control signal being in a second state.

11. The power converter of claim 10 wherein one or more of the output voltage sources further comprise an output capacitor.

12. The power converter of claim 10 one or more of the output voltage sources further comprises an output capacitor in parallel with a load.

13. A power converter having an input coupled to an input voltage source having a first and second terminal comprising:

a coupled inductor having an input winding and at least two output windings, each input and output winding having a first and second terminal, the coupled inductor input winding being tightly coupled to each output winding, the input winding first terminal being connected to the voltage source first terminal, an input bi-directional switch, a FET, having a conduction channel and a control terminal, the conduction channel having first and second terminals, the conduction channel first terminal being connected to the input winding second terminal and the conduction channel second terminal being connected to the voltage source second terminal, at least a first and second output bi-directional switch, FETs, each having a conduction channel and a control terminal, said each conduction channel having a respective first and second terminal, the first output winding being coupled in series with the first output voltage source and the first output bi-directional switch conduction channel, a battery having a first and a second terminal, the second output winding first terminal being coupled to the first terminal of the battery, the second output bi-directional switch conduction channel first terminal being connected to the second output winding second terminal and the conduction channel second terminal being connected to the battery second terminal, a clock circuit providing a first and second control signal, each control signal having a first and second state, the second control signal having a state that is the complement of the first control signal, the first control signal first state duration followed by the second control signal first state duration forming a substantially fixed clock period, the first control signal being coupled to the input bi-directional switch control terminal and the second control signal being coupled to the first and second output bi-directional switch control terminals, the input bi-directional switch conduction channel being driven into a conductive state in response to the first control signal being in a first state and into a non-conductive state in response to the first control signal being in a second state, each respective output bi-directional switch conduction channel being driven into a conductive state in response to the second control signal bring in a first state and into a non-conductive state in response to the second control signal being in a second state.

14. The converter of claim 13 wherein the second output winding first terminal is connected in series with the battery first terminal via the series combination of a charging diode and a current limiting resistor;

whereby, the second output winding provides charging current through the charging diode to charge the battery.

15. The converter of claim 13 further comprising:

a blocking diode having a cathode terminal and an anode terminal, the battery first terminal being connected to the blocking diode anode terminal, the blocking diode cathode terminal being connected to the second output winding first terminal, whereby, the battery provides power to the second output winding through the blocking diode to support continued operation of the dc-to-dc converter in response to a loss of power from the input voltage source.

16. The converter of claim 15 wherein a controlled directional current regulator has been added in series with the battery and the blocking diode.

17. The converter of claim 13 further comprising:

a blocking diode having a cathode and an anode terminal, the diode cathode terminal being connected to the second output winding first terminal, an inductor having a first terminal connected to the battery first terminal, and a second terminal connected to the diode anode terminal, and an input voltage source monitor circuit for monitoring the input voltage of the input voltage source and for outputting an enable signal in response to the input voltage dropping below a first threshold and for removing the enable signal in response to the input voltage rising above a second threshold;

a semiconductor switch having a conduction channel having a first and second terminal, and control terminal, the semiconductor switch conduction channel first terminal being connected to the inductor second terminal and the semiconductor switch conduction channel second terminal being connected to the battery second terminal, the semiconductor switch control terminal being driven by the first control signal in response to an enable signal;

whereby, the blocking diode, inductor and semiconductor switch operate as a boost converter to extract power from the battery and to provide power to the second output winding through the blocking diode to support continued operation of the converter in response to the input voltage dropping below the first threshold, the converter output voltages being regulated by the duty ratio of the first and second control signals.

* * * * *